United States Patent [19]

Hosmer et al.

[11] Patent Number: 4,926,529
[45] Date of Patent: May 22, 1990

[54] TENTER FRAME APPARATUS AND METHOD

[75] Inventors: Christopher E. Hosmer, Taylors, S.C.; John F. Whaley, Warwick, R.I.

[73] Assignee: Marshall and Williams Company, Providence, R.I.

[21] Appl. No.: 244,300

[22] Filed: Sep. 15, 1988

[51] Int. Cl.⁵ .......................... D06C 3/02; D06C 3/10; B21L 53/10
[52] U.S. Cl. ........................................ 26/89; 29/445; 29/525; 29/898.055; 29/898.15; 59/5; 59/8; 384/42; 384/909; 384/546
[58] Field of Search .............. 29/445, 525, 149.5 NM; 26/89, 93, 94; 59/5, 6, 8; 384/543, 546, 25, 42, 909; 198/850-853

[56] References Cited

U.S. PATENT DOCUMENTS

| | | | |
|---|---|---|---|
| 2,246,086 | 6/1941 | Austin | 384/909 X |
| 2,459,598 | 1/1949 | Stott | 29/149.5 NM X |
| 2,479,653 | 8/1949 | Walter | 384/42 |
| 2,622,949 | 12/1952 | Cotchett | 29/149.5 NM X |
| 2,675,276 | 4/1954 | Daugherty | 29/149.5 NM X |
| 2,835,539 | 5/1958 | Conrad | 384/42 |
| 2,975,128 | 3/1961 | Stott | 384/909 X |
| 3,054,645 | 9/1962 | Evans | 384/42 |
| 3,388,923 | 6/1968 | Maynard | 29/445 X |
| 3,584,101 | 6/1971 | Martz | 29/445 X |
| 4,602,407 | 7/1986 | Gresens | 26/89 |

FOREIGN PATENT DOCUMENTS

| | | | |
|---|---|---|---|
| 119898 | 9/1984 | European Pat. Off. | 59/5 |
| 1296326 | 5/1962 | France | 59/5 |
| 106741 | 6/1984 | Japan | 59/5 |

*Primary Examiner*—Charlie T. Moon
*Attorney, Agent, or Firm*—Bailey & Hardaway

[57] ABSTRACT

A tenter frame is illustrated wherein a chain is fabricated by press fitting a pin receiving bushing constructed of Vespel and the like into a steel bushing and then boring a pin receiving opening therein and utilizing wear strips constructed of Vespel in a dovetail configuration opposite the tenter chain providing a lubrication free tenter wherein the chain may be tensioned without excessive stretching.

11 Claims, 3 Drawing Sheets

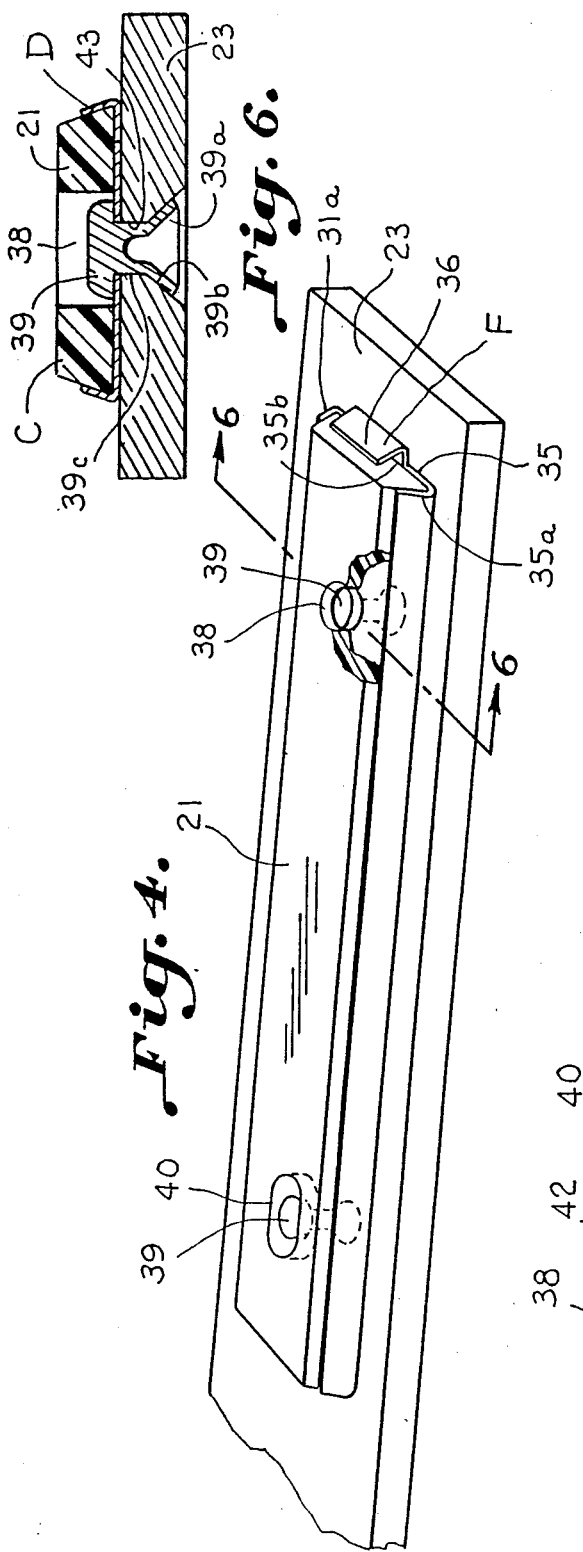
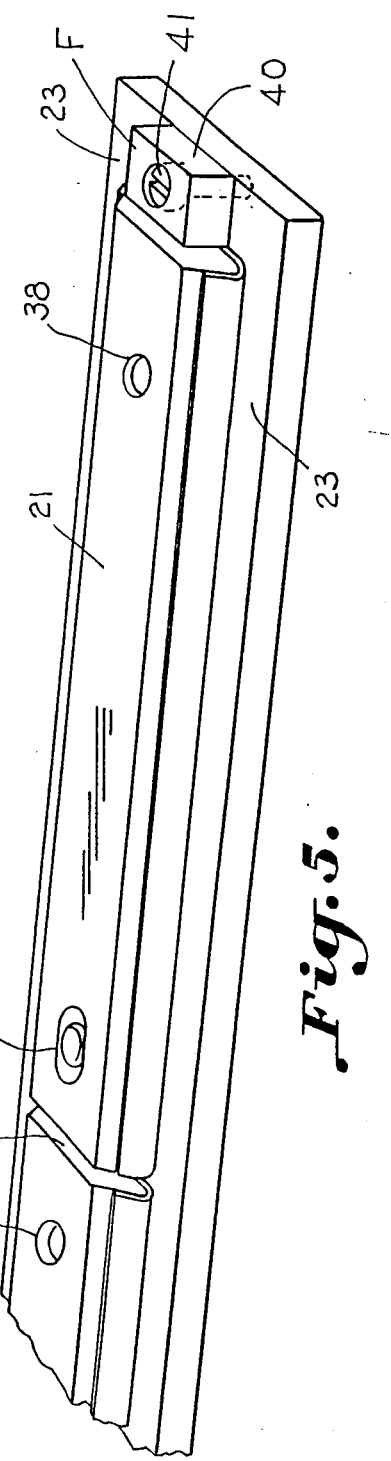

TENTER FRAME APPARATUS AND METHOD

BACKGROUND OF THE INVENTION

This invention relates to the provisions of a lubrication free tenter chain and tenter. Elimination of lubrication to the chain pins and rollers of a tenter chain will greatly reduce the quantity of oil required to be put onto the tenter chain, thereby greatly reducing the chance of oil being thrown off or splattered onto the cloth. A self-lubricating bushing liner can be used in place of oil lubrication, but it must be able to withstand temperatures of up to 450° F. with very high pressure loading caused by the chain tension and have a low wear rate. At present a Teflon-type of material has been used successfully in certain low tension types of tenter chains but these wear excessively in standard types of tenter chains where tension is higher.

Accordingly, it is an important object of this invention to provide a tenter chain having a bushing liner constructed of low friction wear resistant plastic material stable at high ambient temperatures which will be of minimal thickness so that compression thereof does not result in excessive stretching of the tenter chain when under such tension as occurs during normal operation.

Another important object of the invention is the provision of wear strips constructed of Vespel and the like which may be suitably mounted so as to confine the material in case of breakage and to avoid shattering of the material. Vespel is a registered trademark of the E. I. Dupont de Nemours Company used to describe parts which are made from Dupont's polyimide resin.

Still another important object of the invention is the provision of a dovetail mounting and/or the employment of countersunk rivets so as to provide a lubrication free tenter chain while avoiding contamination with provision for thermal expansion of the wear strips and the like.

SUMMARY OF THE INVENTION

The high temperature capability and high bearing load characteristics of Dupont's Vespel material make it a desirable material for a self-lubricating bushing. Preferably, Vespel SP-21 and SP-211 is utilized for wear strips and in the structures illustrated herein. Vespel is a polyimide resin suitable for use herein and is available in solid shapes for machining or it can be molded into shapes by a process similar to powder metallurgy. The high price of solid stock material makes machining parts from it not practical for tenter chain parts. The price of the molded parts is much less, but molded parts cannot be made with as thin a wall section as a chain bushing liner requires.

Reasons for a thin wall bushing include:
(1) Space requirements;
(2) The thinner wall the bushing liner has, the less compressibility and hence stretch will be imparted to the chain when under tension;
(3) Approximately 0.010" of wear is allowable, so extra thickness would be of no use except to add cost to the part.

The method includes molding a part into as thin a wall as possible, then pressing it into the steel chain bushing and boring it out to final size while press fitted into the bushing.

High pressure and high speed operation of unlubricated soft steel plates sliding on Vespel SP-21 or SP-211 material will result in wear on the steel plate, which, due to a roughening surface finish on the plates, causes a rapid wear rate of the Vespel. Therefore, the steel surfaces must be hardened and be as smooth and flat as possible. With surfaces ground flat to a 16 RMS finish and case hardened file hard, there is little wear on steel plates and minimal wear on the Vespel.

By utilizing a mounting having a dovetail configuration with complimentary cross section of the Vespel, it is possible to minimize machining and thickness of the Vespel while protecting same against breaking due to the inherent brittleness of the material and retaining such material if it is broken. Preferably the Vespel is carried across a machined dovetail slot in the side, top and bottom casings as illustrated in the drawings within a mounting clip constructed of sheet metal material bent into a dovetail configuration as is also illustrated.

Suitable fastenings for the dovetail strips within the mounting clip include an abutment carried at one end so that successive strips may be placed bearing against the abutment and each other in end to end relation with the direction of travel of the chain tending to urge the strips towards the abutment. It is preferable to utilize a fixed fastening for one end of each strip while the other end of the strip is provided with a slotted fastening which may compensate for expansion and contraction due to temperature variations. Preferably tubular rivets are utilized as illustrated. Such rivets lend themselves to being flared with a countersunk hole in the slide casing so that no extra clearance is required for the rivet heads and there is no danger of rivet heads being sheared off by moving parts. Since the rivets are countersunk, collection of extraneous material on the tenter frames as may contaminate them and the material being treated is avoided. This construction possesses advantages over the use of threaded fasteners which can back out due to vibration and can be difficult to remove after long periods in a harsh environment.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is a perspective view illustrating a wear strip constructed in accordance with the present invention;

FIG. 5 is a perspective view illustrating a mounting for a wear strip constructed in accordance with a modified form of the invention; and FIG. 6 is a transverse sectional elevation taken on the line 6—6 in FIG. 4.

DESCRIPTION OF A PREFERRED EMBODIMENT

A lubrication free tenter chain having a pin and steel bushing carried thereon includes a press fitted molded bushing liner A constructed of low friction wear resistant plastic material stable at high temperatures in the steel bushing. An axial bore B in the bushing liner machined therein while the bushing liner is press fitted into the steel bushing increasing the size of the opening in said liner to accommodate the pin and minimize the thickness of the liner. Thus, breakage of the bushing liner during boring is avoided while minimized thickness thereof reduces stretching of the chain due to compression of the liner resulting from tensioning of the chain. The chain rollers have a similar liner construction. Low friction wear resistant plastic lubrication free wear strips C stable at high temperatures are mounted in end to end relationship opposite the chains. A longitudinal dovetail mounting D supports the strips along a back portion and at upper and lower edges providing said strips with a forwardly projecting wear portion for sliding contact by said chain. A wear plate E carried by the chain has ground hardened steel surfaces engaging the wear portion of the strips for sliding movement during operation of the tenter chain.

An abutment F is provided at one end of the dovetail mounting restraining a wear strip within a machined dovetail mounting and additional wear strips are inserted into the dovetail mounting in the direction of movement of the chain when in operation. Alternatively one end of each of the wear strips may be fixed and a slotted fastening provided at the other end of each of the wear strips with the wear strips being in spaced relationship to each other to provide for longitudinal thermal expansion. The dovetail mountings may be constructed of sheet metal with inwardly converging upper and lower flanges. Countersunk pop rivets are provided for fixing the one end and fastening at the other end of each wear strip.

Figure 1:
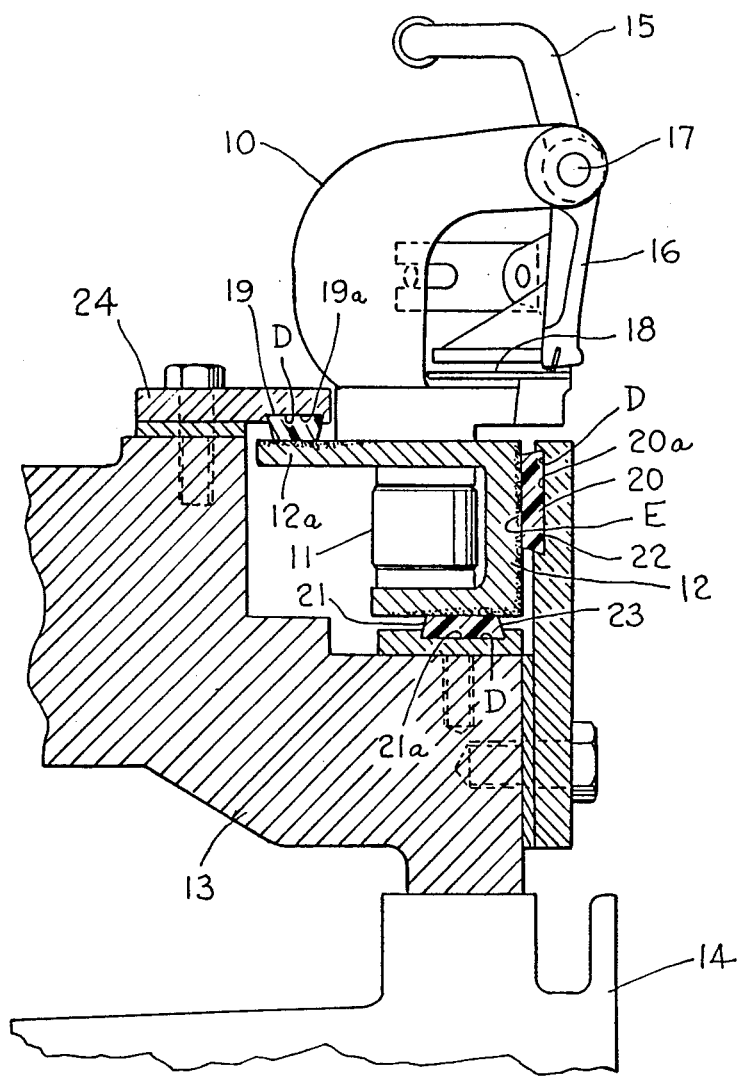
FIG. 1 is a transverse sectional elevation taken across a rail of a tenter frame illustrating wear strips constructed in accordance with the present invention.
Figure 2:
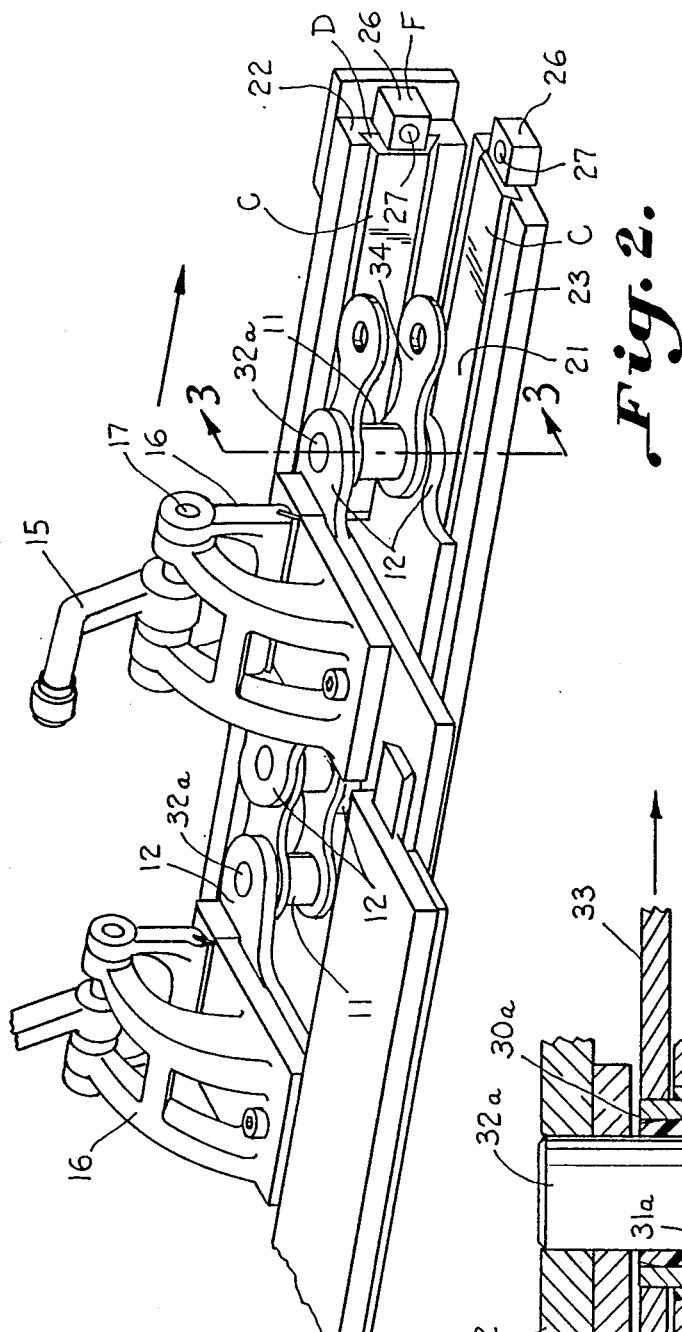
FIG. 2 is a perspective view further illustrating a wear strip constructed in accordance with the invention.

Referring more particularly to the drawings, a rail for carrying a tenter clip having a C-shaped frame 10 is illustrated. The tenter clip is carried by a chain having a roller designed at 11. A slide plate 12 has upper and lower connectors 12a. The rail 13 is carried by the usual frame 14. A tenter clip includes the usual lever 15 for actuating the movable upper jaw pivoted as at 17 on a free upper end of the C-shaped frame member 10. The lower jaw is fixed as is illustrated at 18. In FIGS. 1 and 2 Vespel wear strips are illustrated in dovetail configuration as at 19, 20 and 21 being positioned in the top, side and bottom casings, 22, 23 and 23 respectively. It will be noted that dovetail slots 19a, 20a and 21a respectively are provided for positioning the Vespel wear strips. The Vespel wear strip 19 is provided opposite the hold-down member.

In FIG. 2 abutments 26 are suitably secured as by screws 27 so as to confine the respective wear strips within the dovetail mountings. The direction of movement of the chain and tenter clips is illustrated by the arrow in FIG. 2.

Figure 3:
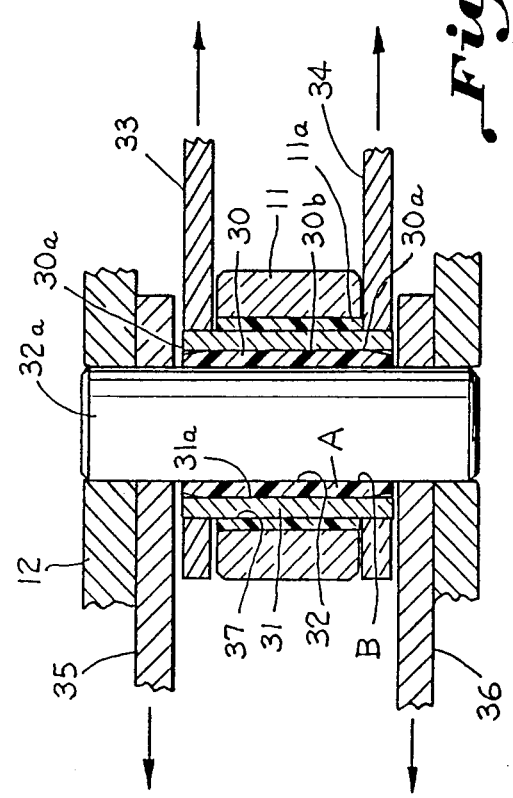
FIG. 3 is a sectional elevation illustrating a bushing liner utilizing a lubrication free tenter chain constructed in accordance with the invention.

FIG. 3 illustrates a liner A which is constructed of molded Vespel and the like illustrated at 30. The liner has tapered end portions as illustrated at 30a adjacent each outer end with a cylindrical portion 30b therebetween. The liner is carried in a suitable steel bushing 31 which has an opening 31a to receive the liner 30. The opening within the liner is illustrated at 32 and is placed therein by boring after the liner sleeve is press fitted into the bushing. The roller 11 has a molded Vespel liner 11a constructed in an identical manner as the bushing. It is important that the boring occur in both the liners A and 11a to enlarge the openings already in the respective liners while being supported within the bushing and the rollers 11 respectively so as to prevent shattering of the brittle Vespel material. It is important that the Vespel material be of minimal thickness to provide for critical wear while avoiding excessive stretching or elasticity of the chain due to the fact that the Vespel is somewhat compressible as compared to steel. The chain has links 33 and 34 which are illustrated as being in tension as well as outside links 35 and 36 all of which engage the pin 32a. A roller is illustrated at 37 for confinement within the connectors 12a.

The wear strips C illustrated in FIG. 2 are carried within a dovetail confinement on mounting D which has been machined in the form of a dovetail slot within the respective casings.

FIG. 4 illustrates a mounting clip 35 formed by a sheet material member for converging flanges 35a joined by a web member 35b. A tab 36 is struck up at the end of the casing to provide confinement for the respective strips 21. The strips are provided with a fixed fastening including a circular hole 38 to accommodate a rivet 39 at one end while a slot 40 is provided at the other end to accommodate the rivet 39.

In FIG. 5 an abutment 40 is illustrated as being secured above a screw 41 in an end to confine the wear strip 21 within the mounting. A space is illustrated at 42 between strips in FIG. 4. The rivet is illustrated in FIG. 5 which includes a head 39 and a flared base 39a carried within a flared opening portion 39b into casing 23. The casing has an opening 43 in the face thereof for accommodating the shank portion 39c of the rivet.

It is thus seen that a lubrication free tenter frame has been provided utilizing essentially a sleeve constructed of thin Vespel sleeves and the like to limit stretching of the chain together with dovetail Vespel strips. The chain is fabricated utilizing a steel bushing wherein the sleeve is press fitted therein prior to boring a hole therein to accommodate the pins of the tenter chain. The dovetail mountings may be provided by machining of the casings, or a clip utilizing bent sheet metal having inward converging flanges may be utilized.

While a preferred embodiment of the invention has been described using specific terms, such description is for illustrative purposes only, and it is to be understood that changes and variations may be made without departing from the spirit or scope of the following claims.

What is claimed is:

1. The method of fabricating a lubrication free tenter for processing sheet material including a chain having a pin and steel bushing carried thereon opposite a tender rail comprising the steps of:
    press fitting a molded bushing liner constructed of low friction wear resistant polyimide resin or the like plastic material stable at high temperatures into said steel bushing; and
    then axially boring said bushing liner while press fitted into the steel bushing increasing the size of the opening therein to accommodate the pin and minimize the thickness of the liner;
    whereby breakage of the bushing liner during boring is avoided while minimized thickness thereof reduces stretching of the chain due to compression of the liner resulting from tensioning of the chain.

2. The method set forth in claim 1 wherein said chain has a steel roller carried on said steel bushing including the steps of:
   press fitting a molded roller liner constructed of low friction wear resistant polyimide resin or the like plastic material stable at high temperatures into said roller; and
   then axially boring said roller liner while press fitted into the steel roller increasing the size of the opening therein to accommodate the bushing and minimize the thickness of the roller liner;
   whereby breakage of the roller liner during boring is avoided.

3. The method set forth in claim 1 including the step of mounting low friction wear resistant polyimide resin or the like plastic lubrication free wear strips stable at high temperatures longitudinally in end to end relationship opposite said chain.

4. The method set forth in claim 3 including the step of providing a longitudinal dovetail mounting supporting said strips along a back portion and at upper and lower edges providing said strips with a forwardly projecting wear portion for sliding contact by said chain.

5. The method set forth in claim 4 including provided said chain with a wear plate having ground hardened steel surfaces engaging said wear portion of said strips for sliding movement during operation of said tenter chain.

6. The method set forth in claim 5 including providing an abutment at one end of said dovetail mounting restraining a wear strip within said dovetail mounting and then inserting additional wear strips into said dovetail mounting in the direction of movement of said chain when in operation.

7. The method set forth in claim 5 including fixing one end of each of said wear strips, and providing a slotted fastening at the other end of each of said wear strips with said wear strips being in spaced relationship to each other to provide for longitudinal thermal expansion.

8. The method set forth in claim 7 including utilizing countersunk pop rivets for fixing said one end and fastening at the other end of each wear strip.

9. A lubrication free tenter for processing sheet material including a chain having a pin and steel bushing carried thereon opposite a tenter rail comprising:
   a press fitting molded bushing liner constructed of low friction wear resistant polyimide resin or the like plastic material stable at high temperatures in said steel bushing; and
   an axial bore in said bushing liner machined therein while said bushing liner is press fitted into the steel bushing increasing the size of the opening in said liner to accommodate the pin and minimize the thickness of the liner;
   whereby breakage of the bushing liner during boring is avoided while minimized thickness thereof reduces stretching of the chain due to compression of the liner resulting from tensioning of the chain.

10. The structure set forth in claim 9 wherein said chain has a steel roller carried on said steel bushing including:
    a press fitted molded roller liner constructed of low friction wear resistant plastic polyimide resin or the like material stable at high temperatures in said steel roller; and
    an axial bore in said roller liner machined therein while said roller liner is press fitted into the steel roller increasing the size of the opening therein to accommodate the bushing and minimize the thickness of the roller liner.

11. The structure set forth in claim 9 including low friction wear resistant polyimide resin or the like plastic lubrication free wear strips stable at high temperatures mounted in end to end relationship opposite said chain.

12. The structure set forth in claim 11 wherein said bushing liner and said wear strips are constructed of Vespel and including a longitudinal dovetail mounting supporting said strips along a back portion and at upper and lower edges, and a forwardly projecting wear portion of said strips for sliding contact by said chain.

13. The structure set forth in claim 12 including a wear plate having ground hardened steel surfaces engaging said wear portion of said strips for sliding movement during operation of said tenter chain.

14. The structure set forth in claim 12 including an abutment at one end of said dovetail restraining a wear strip within said dovetail mounting and additional wear strips carried in said dovetail mounting being restrained opposite the direction of movement of said chain in operation.

15. The structure set forth in claim 12 including means fixing one end of each of said wear strips, and a slotted fastening at the other end of each of said wear strips with said wear strips being in spaced relationship to each other to provide for longitudinal thermal expansion.

16. The structure set forth in claim 15 including countersunk pop rivets fixing said one end and fastening at the other end of each wear strip.

* * * * *